United States Patent
Avancha et al.

(10) Patent No.: US 9,390,251 B2
(45) Date of Patent: Jul. 12, 2016

(54) DELIVERING DATA FROM A RANGE OF INPUT DEVICES OVER A SECURE PATH TO TRUSTED SERVICES IN A SECURE ELEMENT

(75) Inventors: Sasikanth Avancha, Karnataka (IN); Ninad Kothari, Karnataka (IN); Rajesh Banginwar, Karnataka (IN); Taeho Kgil, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 14/124,965

(22) PCT Filed: Jul. 31, 2012

(86) PCT No.: PCT/US2012/049028
§ 371 (c)(1),
(2), (4) Date: May 19, 2014

(87) PCT Pub. No.: WO2013/022655
PCT Pub. Date: Feb. 14, 2013

(65) Prior Publication Data
US 2014/0310799 A1  Oct. 16, 2014

(51) Int. Cl.
G06F 7/04 (2006.01)
G06F 21/36 (2013.01)
G06F 21/83 (2013.01)
G06F 3/038 (2013.01)
G06F 9/445 (2006.01)

(52) U.S. Cl.
CPC ............... *G06F 21/36* (2013.01); *G06F 21/83* (2013.01); *G06F 3/038* (2013.01); *G06F 8/60* (2013.01)

(58) Field of Classification Search
CPC .......................... G06F 21/31; G06F 21/6218
USPC .............................................................. 726/17
See application file for complete search history.

(56) References Cited

U.S. PATENT DOCUMENTS

| 2005/0086666 A1 | 4/2005 | Nason et al. |
| 2006/0253706 A1* | 11/2006 | Roberts ................... G06F 21/42 713/168 |
| 2010/0031320 A1 | 2/2010 | Bhesania et al. |
| 2010/0287315 A1 | 11/2010 | Ibrahim et al. |
| 2013/0179685 A1* | 7/2013 | Weinstein ............... G06F 21/85 713/168 |

FOREIGN PATENT DOCUMENTS

| KR | 10-2003-0036276 A | 5/2003 |
| WO | 2013/022655 A1 | 2/2013 |

OTHER PUBLICATIONS

International Preliminary Report on Patentability received for PCT Patent Application No. PCT/US2012/049028, mailed on Feb. 20, 2014, 6 pages.
International Search Report and Written Opinion received for PCT Patent Application No. PCT/US2012/049028, mailed on Dec. 26, 2012, 9 pages.

* cited by examiner

*Primary Examiner* — Anthony Brown
(74) *Attorney, Agent, or Firm* — Jordan IP Law, LLC

(57) ABSTRACT

Systems and methods of delivering data from a range of input devices may involve detecting an availability of data from an input device, wherein the input device is associated with a default input path of a mobile platform. An input device driver can be invoked in a security engine in response to the availability of the data if a hardware component in the default input path is in a secure input mode, wherein the security engine it associated with a secure input path of the mobile platform. Additionally, the input device driver may be used to retrieve the data from the input device into the security engine.

14 Claims, 4 Drawing Sheets

US 9,390,251 B2

DELIVERING DATA FROM A RANGE OF INPUT DEVICES OVER A SECURE PATH TO TRUSTED SERVICES IN A SECURE ELEMENT

BACKGROUND

1. Technical Field

Embodiments generally relate to the deployment of trusted services on mobile platforms. More particularly, embodiments relate to inputting security-sensitive data into mobile platforms.

2. Discussion

Trusted services for mobile applications such as m-commerce (mobile commerce) may be relevant to the future growth of a wide variety of system-on-chip (SoC) platforms. While traditional applications can execute on the main applications processor in an un-trusted environment provided by the host operating system (OS), trusted services may execute within a trusted environment (i.e., outside the trust boundary of the host OS on the applications processor) provided by a secure element. To function correctly, these trusted services might use high-assurance data obtained from one or more security-sensitive input devices (e.g., touch screen, keypad, GPS receiver). Other un-trusted host applications, however, could concurrently access these same input devices, leading to potential security and/or authenticity concerns. Furthermore, such concerns may also be heightened for environments in which the input devices connect to the SoC via a range of interfaces, e.g., I²C (Inter-IC, e.g., I²C Specification UM 10204, Rev. 03, Jun. 19, 2007, NXP Semiconductors), SPI (serial peripheral interface) and GPIO (general purpose input/output).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having logic to detect an availability of data from an input device, wherein the input device is to be associated with a default input path of a mobile platform. The logic may also invoke an input device driver in a security engine in response to the availability of the data if a hardware component in the default input path is in a secure input mode. The security engine can be associated with a secure input path of the mobile platform. The logic may also use the input device driver to retrieve the data from the input device into the security engine.

Embodiments may also include a non-transitory computer readable storage medium including a set of instructions which, if executed by a processor, cause a mobile platform to detect availability of data from an input device, wherein the input device is to be associated with a default input path of the mobile platform. The instructions can also cause the mobile platform to invoke an input device driver in a security engine in response to the availability of the data if a hardware component in the default input path is in a secure input mode, wherein the security engine is to be associated with a secure input path of the mobile platform. The instructions may also cause the mobile platform to use the input device driver to retrieve the data from the input device into the security engine.

Other embodiments can include a mobile platform including an input device associated with a default input path, wherein the input device has at least one of a keypad, a touchscreen and a sensor. The mobile platform may also include a system controller unit associated with the default input path, and a security engine associated with a secure input path. The security engine can include logic to detect an availability of data from the input device, and invoke an input device driver in the security engine in response to the availability of the data if the system controller unit is in a secure input mode. The logic may also use the input device driver to retrieve the data from the input device into the security engine.

Figure 1:
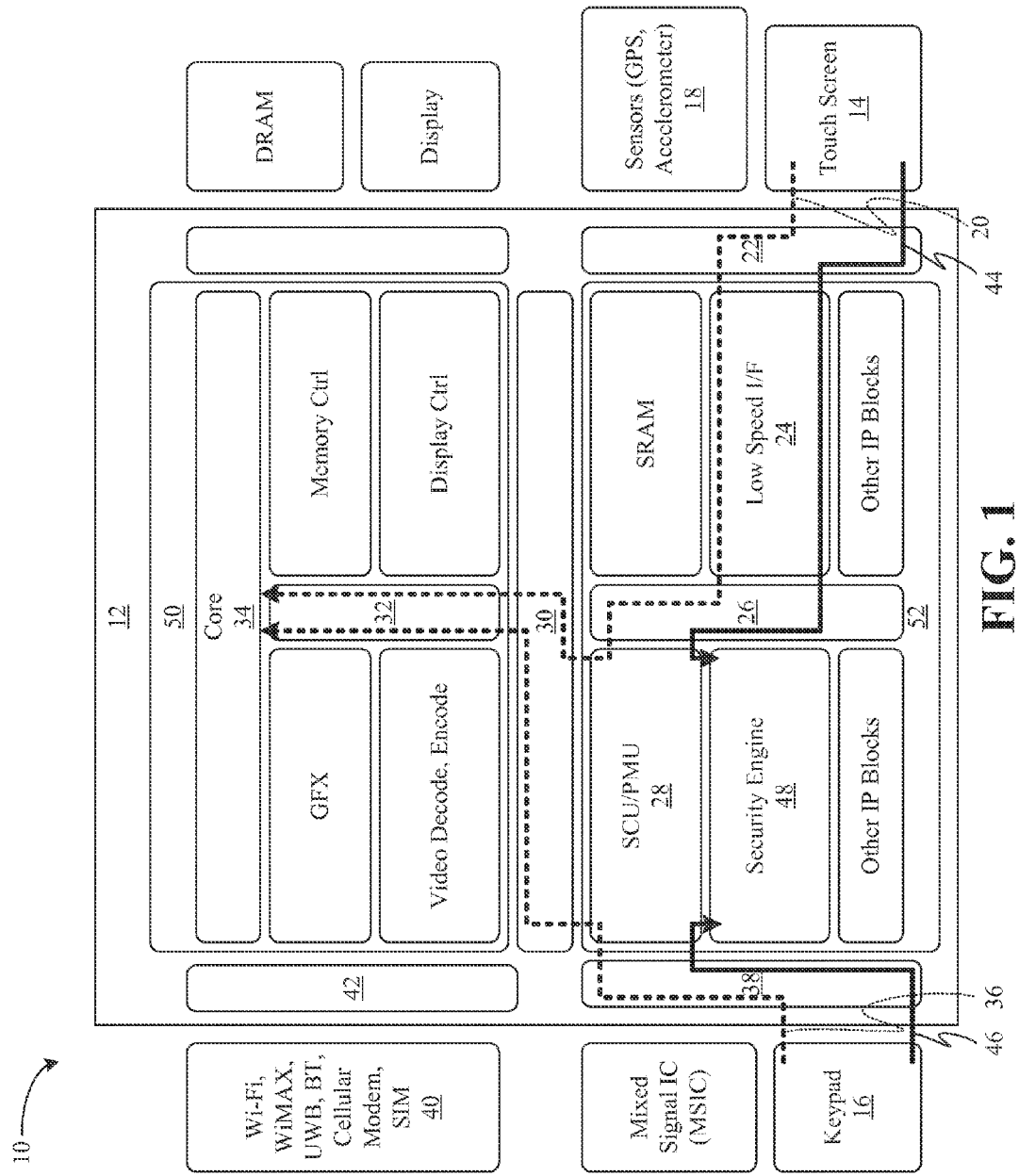
FIG. 1 is a block diagram of an example of a platform having default input paths and secure input paths according to an embodiment.

Turning now to FIG. 1, a mobile platform 10 is shown. The mobile platform 10 could be part of a laptop, mobile Internet device (MID), personal digital assistant (PDA), media player, imaging device, etc., any smart device such as a smart phone, smart tablet and so forth, or any combination thereof. Accordingly, the mobile platform 10 may have a system-on-chip (SoC) subsystem 12 with a north complex chip 50 coupled to a south complex chip 52 via an interconnect bridge 30. In one example, the south complex chip 52 is coupled to a plurality of input devices such as a touch screen 14, a keypad 16 and one or more sensors (e.g., Global Positioning System/GPS sensor, accelerometer, etc.) 18. In the illustrated example, the touchscreen 14 is associated with a default input path 20 of the SoC subsystem 12 that includes a device interface 22, a low speed interface (I/F) 24, an interconnect 26, a system controller unit (SCU, power management unit/PMU, etc.) 28, an interconnect bridge 30, an interconnect 32 and a processor core 34. Similarly, the keypad 16 might be associated with a default input path 36 of the SoC subsystem 12 that includes a device interface 38, the SCU 28, the interconnect bridge 30, the interconnect 32 and the processor core 34. Thus, under conventional operation, the input devices might generate interrupts when data is available at the input devices, wherein the interrupts may be forwarded along the default input paths 20, 36 to the core 34 for processing by one or more applications.

The processor core 34 may also run an application such as an m-commerce (mobile commerce) application that issues trusted service requests in order to conduct one or more security-related operations such as authenticating a user of the mobile platform 10 via one or more of the input devices. The processor core 34 could also run, however, malware that is configured to spoof genuine software applications, intercept secure information intended for genuine software applications, and so on. Indeed, the malware and/or genuine software applications might also execute on another platform that is configured to communicate with the mobile platform 10 via a network controller 40 and associated interface 42. Thus, the network controller 40 could include functionality for cellular telephone (e.g., W-CDMA (UMTS), CDMA2000 (IS-856/IS-2000), etc.), Wi-Fi (e.g., IEEE 802.11, 1999 Edition, LAN/MAN Wireless LANS), Bluetooth (BT, e.g., IEEE 802.15.1-2005, Wireless Personal Area Networks), UWB (Ultra-Wideband, e.g., IEEE 802.15.4a-2007), WiMax (e.g., IEEE 802.16-2004, LAN/MAN Broadband Wireless LANS), subscriber identity module (SIM) communication, and so on.

As will be discussed in greater detail, the SoC subsystem 12 may include secure input paths 44, 46 that have a security engine 48 that functions as a processor with logic (not shown) to detect the availability of data from the input devices, and process the data from the input devices in the secure paths 44, 46 if a hardware component in the default input paths 20, 36 such as the SCU 28 is in a secure input mode. In particular, the logic of the security engine 48 may invoke input device-specific drivers in order to retrieve the available data directly into the security engine 48 for further processing. Additionally, logic within the low-speed peripheral I/F 24 or SCU 28 may send default responses to untrusted applications via the default input paths 20, 36 if the SCU 28 in the default input paths 20, 36 is in the secure input mode. Thus, the secure processing of data by the security engine 48 can be transparent to applications running on the mobile platform 10 or other processor. Moreover, the security engine 48 may determine the appropriate default input path and default response on the fly based on the type of input device involved. Accordingly, the illustrated approach enables the SoC subsystem 12 to enforce dynamic access control on a range of input devices, depending on a user's requirements and choice of input device(s) while executing one or more applications.

Figure 2:
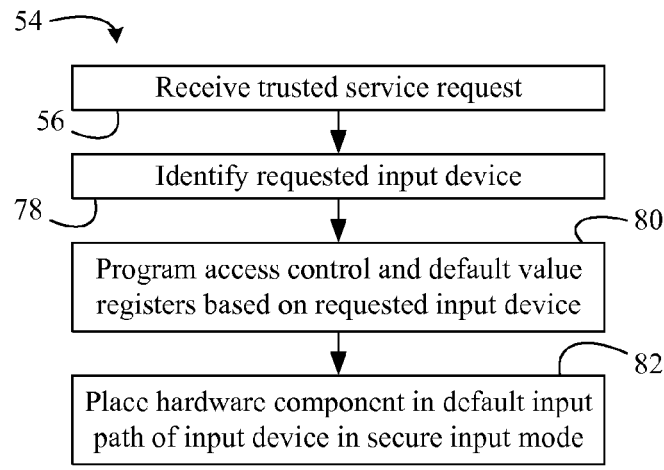
FIG. 2 is a flowchart of an example of a method of establishing a dynamic access control mechanism according to an embodiment.

FIG. 2 shows a method 54 of establishing a dynamic access control mechanism in a mobile platform 10 (FIG. 1). The method 54 may be implemented in fixed-functionality hardware using circuit technology such as application specific integrated circuit (ASIC), complementary metal oxide semiconductor (CMOS) or transistor-transistor logic (TTL) technology, as a set of firmware logic instructions stored in a machine- or computer-readable storage medium of a memory such as random access memory (RAM), read only memory (ROM), programmable ROM (PROM), flash memory, etc., or any combination thereof. Illustrated processing block 56 receives a trusted service request from an application. The trusted service request could be for exclusive access to an input device such as the keypad 16 (FIG. 1). Thus, the trusted service request might be associated with the authentication of a user of the mobile platform prior to granting access to one or more features such as m-commerce functionality, mobile banking functionality, and so on.

Block 78 may identify a requested input device based on the trusted service request, wherein block 80 may program an access control register (ACR) and a default value register (DVR) based on the requested input device. As will be discussed in greater detail, the ACR and DVR may be used to ensure that the behavior of host applications is unaffected by the security scheme and that the scheme remains transparent to them. Illustrated block 82 places a default input path hardware component such as an SCU 28 (FIG. 1) in a secure input mode in response to the trusted service request. As will be discussed in greater detail, placing the default input path hardware in the secure input mode may involve setting a secure input mode indicator in the hardware component to instruct an interrupt service routine of the hardware component to notify the security engine 48 (FIG. 1) when data becomes available at the input device in question.

Figure 3:
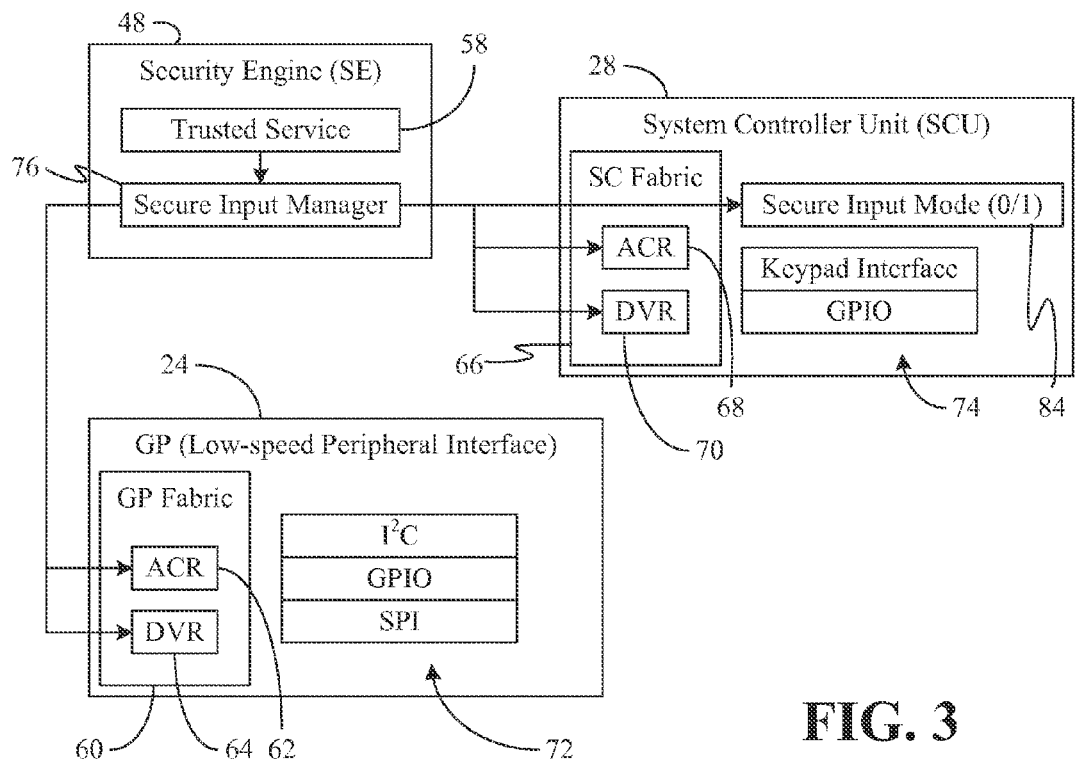
FIG. 3 is a block diagram of an example of a system in which a dynamic access control mechanism is established according to an embodiment.

Turning now to FIG. 3, a unique security scheme is shown in which a dynamic access control mechanism is established so that un-trusted host applications can be prevented from accessing an input device simultaneously with a trusted service 58 running on a security engine 48. As a result, the trusted service 58 may be given exclusive access to the input device in question. In the illustrated example, a low speed peripheral I/F 24 may have input device-specific ports 72 such as I²C (Inter-IC), SPI (serial peripheral interface) and GPIO (general purpose input/output) ports, as well as a general purpose (GP) fabric 60 with an access control register 62 and a default value register 64. Similarly, an SCU 28 may have input device-specific ports 74 such as a keypad interface and a GPIO port, as well as a system controller (SC) fabric 66 with an access control register 68 and a default value register 70.

When the trusted service 58 requests exclusive access to an input device, a secure input manager 76 in the illustrated security engine 48 programs the ACR and DVR in either the SC fabric 66 or GP fabric 60, depending where the input device is connected. Only the secure input manager 76 in the security engine 48 can access and program the registers 62, 64, 68, 70 (on a per input device basis), in the illustrated example. By hardwiring the registers 62, 64, 68, 70 on a per input device basis in the SC fabric 66 and GP fabric 60, the registers 62, 64, 68, 70 can be prevented from being architecturally visible to the host OS and applications. The secure input manager 76 may also transition the SCU 28 into a secure input mode by instructing SC firmware to set a secure input mode indicator 84 in the SCU 28, which causes the SCU 28 to notify the security engine 48 if data is available from the input device in question. In the illustrated example, only the SCU 28 is placed in the secure input mode because the GP fabric 60 forwards all input device interrupts to the SCU 28, which decides whether to deliver the interrupts to a default input path or a secure input path. Other architectures might also involve placing the low speed peripheral I/F 24 in a secure input mode.

As will be discussed in greater detail, on each incoming transaction involving an input device connected to the SCU 28 or low-speed peripheral I/F 24, comparison logic (not shown) in the SC fabric 66 or GP fabric 60 may determine whether device address data in the transaction matches an address in the access control register 68 or access control register 62, respectively. If there is a match and if an untrusted application executing on the core 34 attempts to retrieve data available at the input device in question, then the logic can return a default value programmed in the appropriate default value register 70, 64. The value in default value registers 70, 64 may vary depending on the input device. For example, an entry in the default value register 70 associated with the keypad 16 (FIG. 1) may contain key-code data that maps to the character "*", whereas an entry in the default value register 64 associated with a sensor 18 (FIG. 1) might contain a null value to indicate that a GPS location has not yet been acquired (even though some GPS location information has been acquired).

Figure 4:
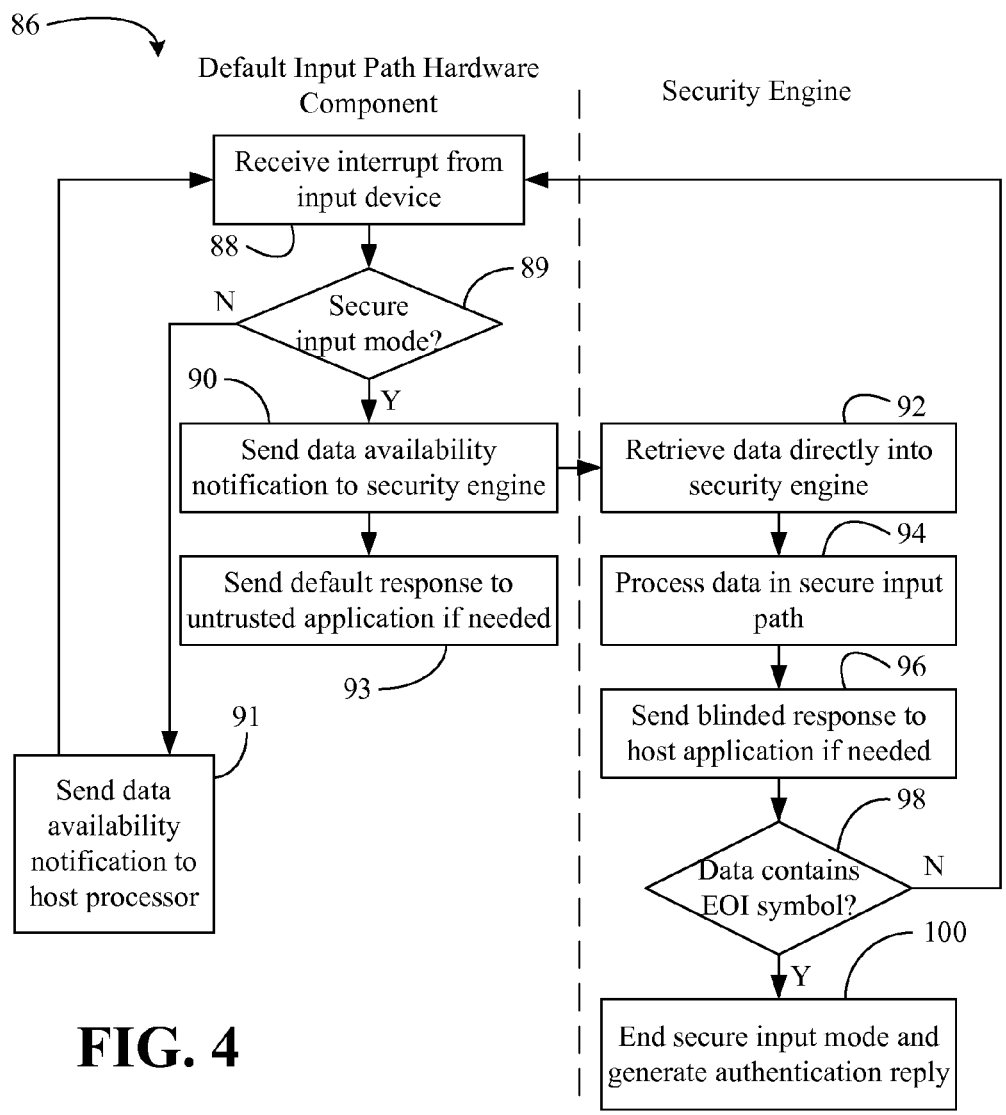
FIG. 4 is a flowchart of an example of a method of processing data available from an input device according to an embodiment.

In particular, FIG. 4 shows a method 86 of processing data available from an input device. Illustrated block 88 receives an interrupt from an input device at a default input path hardware component such as the SCU 28 (FIGS. 1 and 3). Block 89 may provide for determining whether the hardware component is in a secure input mode. If not, a data availability notification can be sent to the core 34 (FIG. 1) of a north complex chip (e.g., host processor) via the default input path based on the interrupt at block 91. If the hardware component is in a secure input mode, a data availability notification may be sent to a secure input path security engine at block 90 based on the interrupt and a default response may be sent to one or more untrusted applications at block 93, if needed. Illustrated block 92 retrieves the data from the input device directly into the security engine. Thus, the data may be processed in the secure input path at block 94. Illustrated block 96 sends a blinded (e.g., encrypted) response to the application that originated the trusted services request via the default input path, if necessary.

A determination may be made at block 98 as to whether the data from the input device contains an end-of-input (EOI) indicator/symbol. If not, the illustrated process returns to block 88 for the next interrupt from the input device. If the data from the input device does contain an EOI indicator, block 100 may instruct the default input path hardware component to exit the secure input mode, and generate an authentication reply based on the data entered via the input device. Thus, the illustrated method 86 provides an iterative process to authenticating passwords, PINs (personal identification numbers), tokens, etc., associated with a trusted service.

Figure 5:
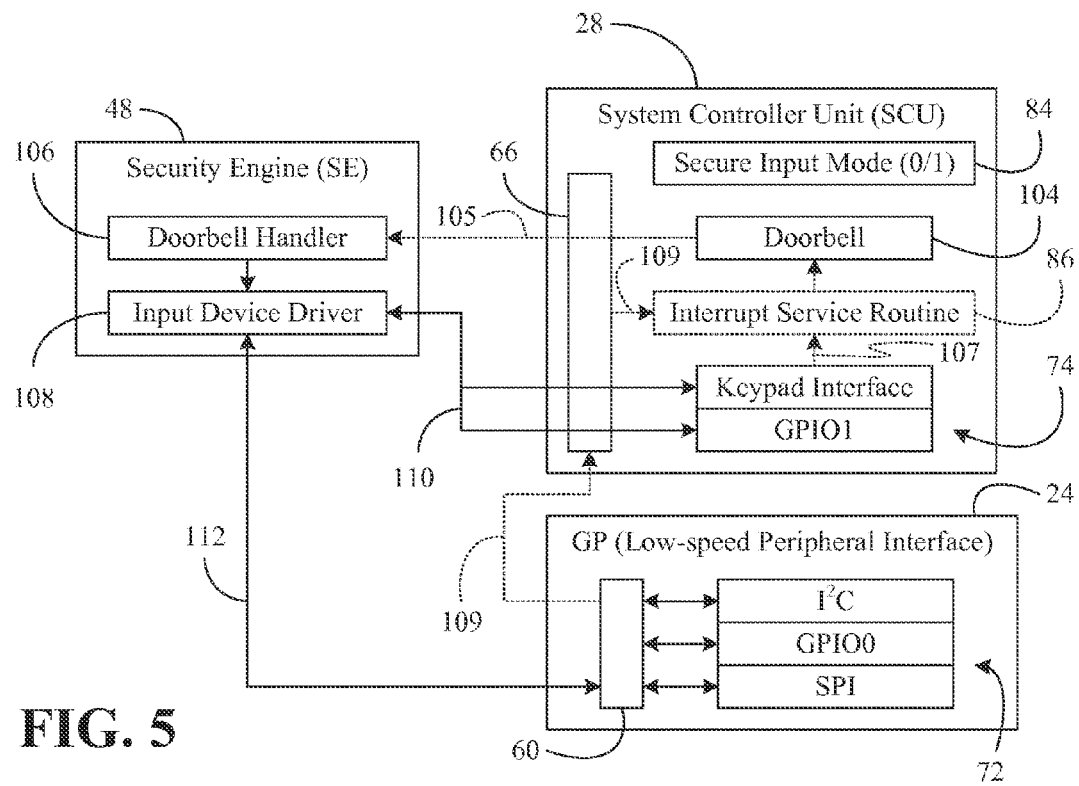
FIG. 5 is a block diagram of an example of a system in which input device interrupts are handled according to an embodiment.

Turning now to FIG. 5, a unique security scheme is shown in which input device interrupts, such as interrupt 107 from ports 74 or interrupt 109 from ports 72, are handled. In the illustrated example, when the secure input mode indicator 84 is set in a hardware component such as the SCU 28, instead of forwarding input device interrupts to the host processor core, an interrupt service routine 86 invokes a doorbell generator module 104 within the SCU 28. The doorbell generator module 104 may send a doorbell message (e.g., data availability notification) 105 to a doorbell handler 106 in the security engine 48 to indicate the availability of data at a specific input device. The illustrated doorbell handler 106 processes the doorbell message 105 and invokes an input device driver 108, also within the security engine 48. The input device driver 108 may issue commands to the appropriate device interface to retrieve data directly into the security engine 48. Thus, the illustrated input device driver 108 retrieves data from input devices coupled to the ports 74 via an SCU data read path 110, and/or retrieves data from input devices coupled to the ports 72 via a GP data read path 112. As already noted, the host processor does not receive data from the input device when the SCU 28 is in the secure input mode, in the example shown.

As also already noted, the low speed peripheral I/F 24 might also be placed in a secure input mode in architectures wherein the interrupt 109 is not routed through the SCU 28. In such a case, the low speed peripheral I/F could have its own interrupt service routine that invokes a doorbell generator module.

Figure 6:
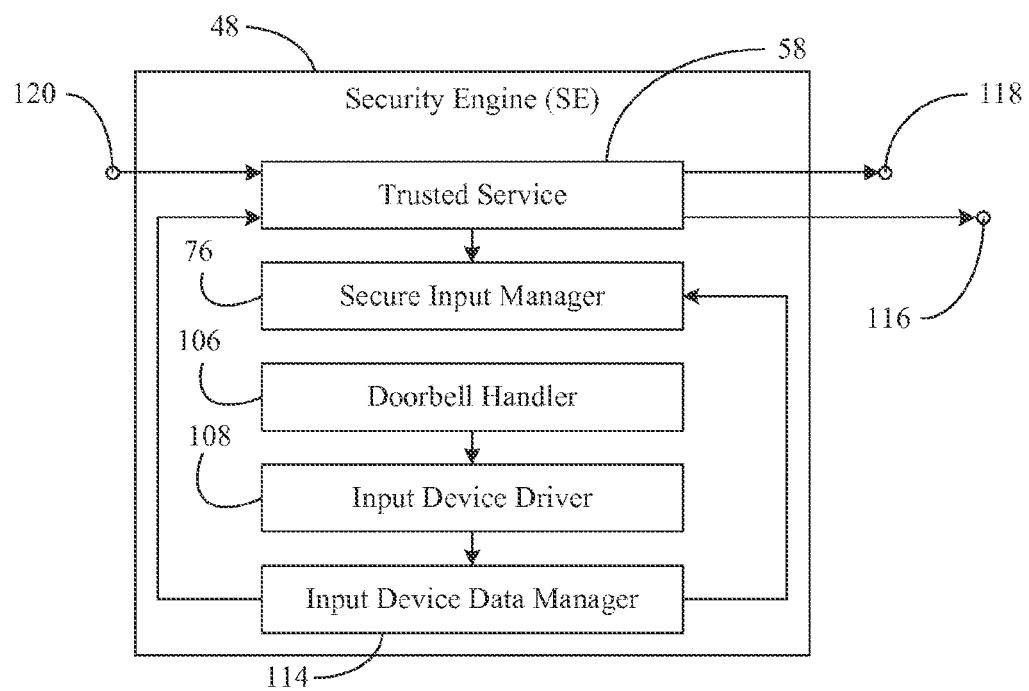
FIG. 6 is a block diagram of an example of a system in which input device data is processed in a secure input path according to an embodiment.

FIG. 6 demonstrates the processing of input device data in a secure input path in which a trusted service 58 has received a trusted service request 120. In the illustrated example, the input device driver 108 invokes an input device data manager (IDDM) 114 within the security engine 48 and passes to it the data retrieved from the input device. The illustrated IDDM 114 processes the data (e.g., maps keypad row/column or touchscreen [x,y] co-ordinate to character), and sends the result to the trusted service 58 within the security engine 48. If the data includes an end-of-input (EOI) indicator (e.g., "Enter" key from keypad or touchscreen), then the IDDM 114 may also send an EOI message to the secure input manager 76. The trusted service 58, which communicates with the corresponding host application through the OS (operating system) stack via a well-defined programming interface, may send intermediate blinded (e.g., encrypted) responses 116 to the application for each data input. It may be assumed that the application can handle intermediate responses appropriately, e.g., render the blinded responses on display. Once data input is complete, the illustrated trusted service 58 sends the appropriate result 118 to the host application (e.g., "user is authentic" or "user authentication failed" or "near GAP store in XYZ mall").

Upon receiving an EOI message, the illustrated secure input manager 76 programs the ACR and DVR of the corresponding input device SC or GP fabric such that comparison logic does not match target addresses within incoming transactions to any valid input device range. Subsequently, the secure input manager 76 may send a message to the SCU, instructing it to exit the secure input mode. As already noted, only the secure input manager 76 in the security engine 48 can access and program the registers (on a per input device basis), in the illustrated example.

Techniques described herein therefore provide a hardware-rooted mechanism to enforce a dynamic access control policies across an arbitrary set of input devices to support trusted services. This capability may enable a wide variety of platforms to support high-assurance applications such as mobile commerce and digital health applications.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising:
    an input device associated with a default input path, the input device including at least one of a keypad, a touchscreen and a sensor;
    an access control register corresponding to the input device;
    a default value register corresponding to the input device, wherein the access control register and the default value register are to be architecturally transparent to an untrusted application associated with the mobile platform;
    a hardware component associated with the default input path; and
    a security engine associated with a secure input path, the security engine having logic to,
        detect an availability of data from the input device,
        receive a trusted service request for exclusive access to the input device,
        place the hardware component into a secure input mode in response to the trusted service request,
        identify the input device based at least in part on the trusted service request,
        program the access control register and the default value register in response to the trusted service request,
        identify the access control register based at least in part on the data from the input device and device address data stored in the access control register,
        identify the default value register based at least in part on the access control register,
        retrieve a default response from the default value register,
        send the default response to the untrusted application,
        invoke an input device driver in the security engine in response to the availability of the data if the hardware component is in the secure input mode, and
        use the input device driver to retrieve the data from the input device into the security engine.

2. The mobile platform of claim 1, wherein the logic is to instruct the hardware component to notify the security engine of the availability of the data from the input device.

3. The mobile platform of claim 1, wherein the logic is to send a blinded response to an application originating the trusted service request.

4. The mobile platform of claim 1, wherein the logic is to,
    detect an end-of-input indicator in the data from the input device, and
    generate an authentication reply in response to detection of the end-of-input indicator.

5. An apparatus comprising:
    logic to,
        detect an availability of data from an input device, wherein the input device is to be associated with a default input path of a mobile platform,
        receive a trusted service request for exclusive access to the input device,
        invoke an input device driver in a security engine in response to the availability of the data if a hardware component in the default input path is in a secure input mode, wherein the security engine is to be associated with a secure input path of the mobile platform,
        place the hardware component into the secure input mode in response to the trusted service request,
        identify the input device based at least in part on the trusted service request,
        program an access control register corresponding to the input device in response to the trusted service request,
        program a default value register corresponding to the input device in response to the trusted service request, wherein the access control register and the default value register are to be architecturally transparent to an untrusted application associated with the mobile platform,
        identify the access control register based at least in part on the data from the input device and device address data stored in the access control register,
        identify the default value register based at least in part on the access control register,
        retrieve a default response from the default value register,
        send the default response to the untrusted application, and
        use the input device driver to retrieve the data from the input device into the security engine.

6. The apparatus of claim 5, wherein the logic is to instruct the hardware component to notify the security engine of the availability of the data from the input device.

7. The apparatus of claim 5, wherein the logic is to send a blinded response to an application originating the trusted service request.

8. The apparatus of claim 5, wherein the logic is to,
    detect an end-of-input indicator in the data from the input device, and
    generate an authentication reply in response to detection of the end-of-input indicator.

9. The apparatus of claim 5, wherein the data is to be available from at least one of a keypad, a touchscreen and a sensor.

10. A non-transitory computer readable storage medium comprising a set of instructions which, if executed by a processor, cause a mobile platform to:
    detect an availability of data from an input device, wherein the input device is to be associated with a default input path of the mobile platform;
    receive a trusted service request for exclusive access to the input device;
    invoke an input device driver in a security engine in response to the availability of the data if a hardware component in the default input path is in a secure input mode, wherein the security engine is to be associated with a secure input path of the mobile platform;
    place the hardware component into the secure input mode in response to the trusted service request;
    identify the input device based at least in part on the trusted service request;
    program an access control register corresponding to the input device in response to the trusted service request;
    program a default value register corresponding to the input device in response to the trusted service request, wherein the access control register and the default value register are to be architecturally transparent to an untrusted application associated with the mobile platform;

identify the access control register based at least in part on the data from the input device and device address data stored in the access control register;

identify the default value register based at least in part on the access control register;

retrieve a default response from the default value register;

send the default response to the untrusted application; and use the input device driver to retrieve the data from the input device into the security engine.

11. The medium of claim 10, wherein the instructions, if executed, cause a mobile platform to instruct the hardware component to notify the security engine of the availability of the data from the input device.

12. The medium of claim 10, wherein the instructions, if executed, cause a mobile platform to send a blinded response to an application originating the trusted service request.

13. The medium of claim 10, wherein the instructions, if executed, cause a mobile platform to:

detect an end-of-input indicator in the data from the input device; and generate an authentication reply in response to detection of the end-of-input indicator.

14. The medium of claim 10, wherein the data is to be available from at least one of a keypad, a touchscreen and a sensor.

* * * * *